United States Patent [19]

Gimpel et al.

[11] 4,310,398

[45] Jan. 12, 1982

[54] SURFACE-COATING BINDERS AND THEIR USE FOR ELECTROCOATING FINISHES

[75] Inventors: Juergen Gimpel, Ludwigshafen; Heinrich Hartmann, Limburgerhof; Hans-Uew Schenck, Wachenheim, all of Fed. Rep. of Germany

[73] Assignee: BASF Aktiengesellschaft, Fed. Rep. of Germany

[21] Appl. No.: 155,125

[22] Filed: May 30, 1980

[30] Foreign Application Priority Data

Jun. 20, 1979 [DE] Fed. Rep. of Germany ....... 2924756

[51] Int. Cl.$^3$ ...................... C08L 63/08; C25D 13/06
[52] U.S. Cl. ..........:................ 204/181 C; 260/23 TN; 260/29.2 TN; 525/327; 525/329; 525/332; 525/336; 526/302; 526/304; 526/305; 526/307; 526/310; 526/312
[58] Field of Search .............. 204/181 C; 260/23 TN, 260/29.2 TN; 525/329, 327, 332, 336; 526/307, 310, 312

[56] References Cited

U.S. PATENT DOCUMENTS

| | | | |
|---|---|---|---|
| 3,299,007 | 1/1967 | Suling et al. | 260/77.5 |
| 3,692,746 | 9/1972 | Woo et al. | 260/77.5 TB |
| 3,694,416 | 9/1972 | Rubens et al. | 260/77.5 BB |
| 3,883,483 | 5/1975 | Anderson et al. | 260/77.5 TB |
| 3,929,156 | 12/1975 | Wismer et al. | 204/181 C |
| 3,933,704 | 1/1976 | Siegler et al. | 260/17.2 |
| 3,947,338 | 3/1976 | Jerabek et al. | 204/181 C |
| 4,001,101 | 1/1977 | Bosso et al. | 204/181 C |
| 4,036,795 | 7/1977 | Tominaga | 204/181 C |
| 4,036,800 | 7/1977 | Sekmakas et al. | 260/29.2 TN |
| 4,038,233 | 7/1977 | Bosso et al. | 260/29.2 TN |
| 4,046,729 | 9/1977 | Scriven | 260/29.2 TN |
| 4,081,343 | 3/1978 | Schimmel et al. | 204/181C |
| 4,097,356 | 6/1978 | Bosso et al. | 204/181 C |
| 4,147,676 | 4/1979 | Pumpouchidis | 260/29.2 TN |
| 4,197,224 | 4/1980 | Schmolzer et al. | 204/181 C |
| 4,212,779 | 7/1980 | Schmolzer et al. | 260/29.2 N |

*Primary Examiner*—William F. Hamrock
*Attorney, Agent, or Firm*—Keil & Witherspoon

[57] ABSTRACT

Surface-coating binders based on a copolymer which contains tertiary amino groups and blocked isocyanate groups and is water-soluble or water-dispersible as a result of being at least partially salified with an acid. The copolymer contains, as copolymerized units, an olefinically unsaturated compound which possesses a tertiary amino group, an N-(1-alkenyl)-isocyanate which is blocked with a CH-, OH- or NH-acidic blocking agent, and another olefinically unsaturated compound, with or without one or more copolymerizable olefinically unsaturated compounds which possess hydrogen atoms which are reactive toward isocyanate groups, and has a mean molecular weight of from 1,000 to 20,000. The novel surface-coating binders are used for the cathodic electrocoating of metallic articles.

5 Claims, No Drawings

SURFACE-COATING BINDERS AND THEIR USE FOR ELECTROCOATING FINISHES

The present invention relates to surface-coating binders based on a copolymer containing tertiary amino groups and blocked isocyanate groups, and to their use for electrocoating finishes.

Binders consisting of acrylate resins which are crosslinked by an isocyanate have been disclosed for electrocoating. Thus, U.S. Pat. No. 3,883,483 describes a polymer composition for cationic electrocoating, which contains the reaction product of a diisocyanate, blocked on one side, with an ethylenically unsaturated hydroxy compound, eg. hydroxyethyl acrylate. However, in this case the isocyanate group required for crosslinking is bonded to the carbon chain of the polymer via an ester bond. A proportion of the ester bonds undergoes cleavage by hydrolysis as the electrocoating bath ages. As a result, the composition of the constituents required for crosslinking changes with the age of the bath. This results in a deterioration of the chemical resistance and corrosion protection afforded by the surface coatings produced.

U.S. Pat. No. 3,694,416 describes coating compositions produced from aliphatically conjugated dienes and blocked vinyl isocyanate, the compositions being crosslinked with hydroxyl-containing polymers. However, this two-component system does not contain any of the ionic groups required for electrocoating.

U.S. Pat. No. 3,692,746 describes coating compositions obtained from vinyl chloride, blocked vinyl isocyanate and other ethylenically unsaturated comonomers by emulsion polymerization with redox initiators. These emulsions are unsuitable for use as electrocoating finishes, since they contain too high a proportion of low molecular weight ionic concomitant materials, and since their bath conductivity is too high. The same is true of the polymers, described in Belgian Pat. No. 652,401, obtained from acrylonitrile, blocked vinyl isocyanate and other ethylenically unsaturated monomers.

It is an object of the present invention to provide surface-coating binders, in particular binders for electrocoating finishes, which contain a defined amount of blocked isocyanate groups bonded directly to the carbon chain of the polymer—with or without the presence of other reactive groups in the polymer molecule—so that they may be used as self-crosslinking binders or as binders requiring an added crosslinking agent.

German Laid-Open Application DOS No. 2,460,785 describes binders, containing blocked vinyl isocyanate as one of the monomers, for powder finishes. However, these polymers are unsuitable for cationic electrocoating, since they do not contain any cationic groups.

The present invention relates to surface-coating binders which are based on a copolymer which contains tertiary amino groups and blocked isocyanate groups and is water-soluble or water-dispersible as a result of being at least partially salified with an acid, wherein the copolymer contains, as copolymerized units, (A) from 6 to 22% by weight of one or more olefinically unsaturated compounds containing a tertiary amino group, (B) from 21 to 40% by weight of an N-(1-alkenyl)-isocyanate blocked with a CH-, OH- or NH-acidic blocking agent, (C) from 0 to 35% by weight of one or more copolymerizable olefinically unsaturated compounds possessing hydrogen atoms which are reactive toward isocyanate groups and (D) from 3 to 73% by weight of one or more copolymerizable olefinically unsaturated compounds not mentioned under (A) to (C), the copolymer having a mean molecular weight of from 1,000 to 20,000 and the percentages of (A) to (D) totaling 100.

The electrocoating finish prepared therefrom in general contains from 7 to 20 percent by weight of the protonized copolymer according to the invention.

The following details may be noted in respect of the components from which the novel surface-coating binder is synthesized:

(A) Suitable components (A) are ethylenically unsaturated compounds possessing a tertiary amino group, such as tertiary amino methacrylic or acrylic acid esters, for example dialkylaminoalkyl acrylates and methacrylates, where alkyl is of 1 to 8 carbon atoms, e.g. N,N-dimethylaminoethyl methacrylate and N,N-diethylaminoethyl acrylate, or acrylamides or methacrylamides containing a tertiary amino group, eg. N,N-dimethylaminopropyl acrylamide or methacrylamide and N,N-diethylaminopropyl acrylamide or methacrylamide.

The novel surface-coating binder contains from 6 to 22, preferably from 6 to 15, % by weight of component (A) as copolymerized units. The use of from 6 to 10 percent by weight of the above acrylamides and methacrylamides containing an amino group is particularly preferred. (B) Component (B) is an adduct of an N-(1-alkenyl)-isocyanate and a CH-, OH- or NH-acidic blocking agent. Suitable N-(1-alkenyl)-isocyanates are those where alkenyl is of 2 to 4 carbon atoms, preferably vinyl isocyanate and/or propenyl isocyanate. Examples of suitable blocking agents for the preparation of component (B) are monophenols, eg. phenol, cresol and trimethylphenol, primary alcohols and secondary alcohols, eg. isopropanol and cyclohexanol, tertiary alcohols, eg. tert.-butanol and tert.-amyl alcohol, easily enolizable compounds, eg. ethyl acetoacetate, acetylacetone, malonic acid derivatives, eg. malonic acid diesters with alcohols of 1 to 8 carbon atoms, malonodinitrile, secondary aromatic amines, eg. N-methylaniline, N-methyltoluidine and N-phenyltoluidine, imides, eg. succinimide and phthalimide, lactams, eg. ε-caprolactam, δ-valerolactam and lauryl-lactam, as well as oximes, eg. acetone-oxime, butanone-oxime and cyclohexanone-oxime. Particularly preferred blocking agents for the N-(1-alkenyl)-isocyanates are tert.-butanol, cyclohexanol and caprolactam.

The preparation of the blocked N-(alk-1-enyl)-isocyanate, eg. of vinyl isocyanate, can be carried out, for example, by a method similar to that described in Houben-Weyl, Methoden der organischen Chemie, volume 14/2 (1963), pages 61–70. Preferably, it is carried out in the presence of a solvent. About equimolar amounts are used for the reaction of the N-(alk-1-enyl)-isocyanate (vinyl isocyanate) with the blocking agent. An excess of the isocyanate should be avoided, since this could subsequently lead to crosslinking. Component (B) is present in the novel copolymer in amounts of from 20 to 40, preferably from 25 to 33, % by weight, in the form of copolymerized units. (C) Suitable reactive monomers (C) are copolymerizable olefinically unsaturated compounds which contain hydrogen atoms which are reactive toward isocyanate groups, ie. which carry, for example, OH or NH groups. Examples of these are monoesters of acrylic acid or methacrylic acid with polyhydric, in particular dihydric, alcohols, eg. hydroxyethyl acrylate and methacrylate, hydroxypropyl acrylate and methacrylate and hydroxybutyl acrylate, and monoesters of the said acids with polyether-diols, eg. polypropylene glycol acrylate and methacrylate, as well as allyl alcohol and but-1-ene-3,4-diol. N-Methylol-acrylamide and N-methylol-methacrylamide may also be used. Ester of acrylic acid or methacrylic acid with diols of 2 to 4 carbon atoms, especially hydroxypropyl acrylate and hydroxyethyl acrylate, are particularly preferred.

Component (C) is present in the novel copolymer in an amount of from 0 to 35, preferably from 20 to 30, percent by weight, as copolymerized units. (D) Suitable components (D) are copolymerizable olefinically unsaturated compounds not mentioned under (A) to (C), eg. esters of acrylic acid and methacrylic acid with monoalcohols of 1 to 18, preferably of 1 to 8, carbon atoms, eg. methyl acrylate, ethyl acrylate, butyl acrylate, ethylhexyl acrylate and methyl methacrylate. All other copolymerizable unsaturated compounds may also be used, in particular vinyl esters of carboxylic acids of 2 to 10 carbon atoms, such as vinyl acetate, vinyl-aromatics, eg. styrene, acrylonitrile and unsaturated triglycerides, eg. isomerized linseed oil.

Component (D) is present in the novel copolymer in an amount of from 3 to 73, preferably from 22 to 49, percent by weight, as copolymerized units.

The novel copolymers are advantageously prepared in polar solvents which are free from OH groups, for example ethers, eg. tetrahydrofuran, or esters, eg. ethyl acetate or n-butyl acetate, in the presence of free radical initiators, eg. azo-bis-carboxamides, azo-bis-carboxylic acid nitriles and peroxides, in general at from 50° to 120° C., preferably from 60° to 90° C., in the presence or absence of regulators, eg. tert.-dodecylmercaptan or diisopropylxanthogen disulfide.

Examples of particularly preferred surface-coating binders are copolymers of from 6 to 10 percent by weight of N,N-diethylaminopropyl acrylamide or methacrylamide, from 25 to 30 percent by weight of caprolactam-blocked vinyl isocyanate or propenyl isocyanate, from 25 to 30 percent by weight of hydroxypropyl acrylate or hydroxyethyl acrylate and from 20 to 40 percent by weight of monomers defined under component D.

The novel copolymers are non-crosslinked products having a molecular weight of from 1,000 to 20,000, preferably from 2,000 to 10,000 (measured by means of a vapor pressure osmometer). The Fikentscher K-values (measured at 3% strength in acetone) are, correspondingly, from 15 to 35, preferably from 18 to 28.

The novel copolymers contain tertiary amino groups and blocked isocyanate groups and may or may not contain structures which are reactive toward isocyanate groups.

According to the invention, these copolymers are used as surface-coating binders and are water-soluble, or water-dispersible, as a result of at least partial salification with acids.

To achieve this latter situation, the copolymers are at least partially neutralized with acids. Organic or inorganic acids may be used as neutralizing agents. Acetic acid, lactic acid and gluconic acid are preferred. For use of the novel surface-coating binders in an aqueous medium, the degree of neutralization is from 10 to 100%.

In addition to the novel binder, the finish can contain polyfunctional crosslinking agents, eg. hydroxylcontaining polymers, polyesters or polyadducts, and pigments eg. titanium dioxide, talc and carbon black, in amounts—depending on the end use—of from 10 to 60, preferably from 20 to 50, parts by weight per 100 parts by weight of binder. In addition, inorganic and organic colored pigments may be present in amounts of up to 5 parts by weight, and fillers also in amounts of up to 5 parts by weight. Leveling agents may be present in amounts of up to 10 parts, waxes (for increasing the scratch resistance) in amounts of up to 10 parts and catalysts (for the unblocking reaction) in amounts of up to 3 parts, in each case per 100 parts of binder.

The novel surface-coating binders are used, in particular, for cathodic electrocoating, namely as selfcrosslinking binders or as binders requiring added crosslinking agents.

The novel electrocoating finishes can be used in particular for coating metallic articles made of, for example, iron, steel and aluminum.

The cationic electrocoating baths are prepared in a conventional manner, for example as described by W. Machu, Elektrotauchlackierung (1974), pages 155 et seq. The solids content of the electrocoating baths is in general from 7 to 15 percent by weight and the pH from 4.0 to 7.5.

The coatings obtained using the novel binders are very hard, resilient and highly resistant to chemicals, especially to acetone.

In the Examples, parts and percentages are by weight, unless stated otherwise.

Preparation of component (B)

(B1) Tert.-butyl N-vinylcarbamate 69 parts of vinyl isocyanate and 70 parts of ethyl acetate are introduced into a reaction vessel equipped with a high-efficiency cooler (employing cooling brine), stirrer, thermometer and feed vessel. 74 parts of tert.-butanol, 73 parts of ethyl acetate and 0.01% of dibutyl-tin dilaurate are added in the course of 1 hour, at 40° C. The reaction is then allowed to continue for 10 hours at 40° C. A light yellow clear solution results. Blocked isocyanate content: 14.7%.

(B2) Cyclohexyl N-vinylcarbamate 69 parts of vinyl isocyanate and 89.5 parts of ethyl acetate are introduced into a reaction vessel and heated to 40° C. A mixture of 110 parts of cyclohexanol and 89.5 parts of ethyl acetate (containing 0.02% of dibutyl-tin dilaurate as the catalyst) is added in the course of 1 hour. The mixture is then allowed to react for a further 2 hours at 40° C. A light yellow solution is obtained, from which the reaction product separates out, as crystals, on cooling. Blocked isocyanate content: 11.7%.

(B3) Vinyl isocyanate/ε-caprolactam adduct 113 parts of ε-caprolactam and 91 parts of ethyl acetate (+0.015% of dibutyl-tin dilaurate) are introduced into a reaction vessel and heated to about 50° C. A mixture of 69 parts of vinyl isocyanate and 91 parts of ethyl acetate is then added dropwise in the course of 1 hour. The reaction is then allowed to continue for 5 hours. A light yellow clear solution is obtained. Blocked isocyanate content: 11.5%.

EXAMPLE 1

43 parts of ethyl acetate are introduced into a reaction vessel equipped with a stirrer, reflux condenser and internal thermometer. This initial charge is heated to 70° C. under nitrogen. The feed, consisting of 54.2 parts of the solution of the blocked isocyanate (B3) 25 parts of 2-hydroxypropyl acrylate, 10 parts of styrene, 30 parts of i-butyl acrylate, 6 parts of N,N-dimethylaminopropyl methacrylamide, 2 parts of azo-bis-isobutyronitrile and 0.5 part of tert.-dodecylmercaptan, is added in the course of three hours at 70° C. Polymerization is then continued for 1 hour at 70° C., after which 1 part of azo-bis-isobutyronitrile is added three times, the polymerization being continued for 1 hour after each addition. A clear solution of a resin having a K-value of 24 and a solids content of 64.5% is obtained.

Electrocoating finish:

The polymer is 60% neutralized with acetic acid, and then used to prepare a 10% strength dispersion in fully demineralized water. Phosphatized sheets, wired as the cathode, are coated in this dispersion at a voltage of 200 V, for 2 minutes. The coatings are then baked for 30 minutes at 160° C. A 12 μm thick acetone-resistant coating is obtained, which has a pendulum hardness of 164 sec (DIN 53,157), gives an Erichsen cupping value of 8.4 mm (DIN 53,156) and exhibits 16 mm rust penetration after 96 hours in the ASTM B 117/64 salt spray test.

EXAMPLE 2

A polymer is prepared, by the method described in Example 1, from 25 parts of the solution of the blocked isocyanate (B1), 25 parts of butanediol monoacrylate, 10 parts of N,N-dimethylaminopropyl methacrylamide, 30 parts of iso-butyl acrylate and 10 parts of styrene. The polymer solution has a K-value of 26 and a solids content of 59.6%.

Electrocoating finish:

After addition of 2% of dibutyl-tin dilaurate, the polymer is 30% neutralized with acetic acid, and then used to prepare a 10% strength dispersion in fully demineralized water. Phosphatized sheets, wired as the cathode, are coated in this dispersion at a deposition voltage of 70 V, for 2 minutes. The finish is baked for 30 minutes at 190° C. A 21 μm thick acetone-resistant film is obtained, which has a pendulum hardness of 154 sec, gives an Erichsen cupping value of 5 mm and exhibits 20 mm rust penetration after 96 hours in the salt spray test.

Pigmented electrocoating finish:

After addition of 2% of dibutyl-tin dilaurate, the polymer is 40% neutralized with acetic acid. 7 parts of titanium dioxide (rutile type), 10 parts of talc, 12 parts of zinc sulfide and 2.6 parts of carbon black are added as pigments, and a 15% strength dispersion in fully demineralized water is then prepared. Phosphatized sheets are cathodically coated in the dispersion at 100 V deposition voltage for 2 minutes. The finish is baked for 30 minutes at 220° C. A 13 μm thick acetone-resistant film is obtained, which has a pendulum hardness of 120 sec and an Erichsen cupping value of 5.0 mm and exhibits 20 mm rust penetration after 48 hours in the salt spray test.

EXAMPLE 3

A polymer is prepared, by the method described in Example 1, from 40 parts of the solution of the blocked isocyanate (B2), 35 parts of hydroxyethyl methacrylate, 15 parts of 2-ethylhexyl acrylate and 10 parts of N,N-dimethylaminopropyl methacrylamide. The polymer solution has a solids content of 51% and a K-value of 20.

Electrocoating finish:

After addition of 2% of dibutyl-tin dilaurate, the polymer is 30% neutralized with acetic acid. Phosphatized sheets wired as the cathode are coated in a 10% strength aqueous dispersion of the product at 150 V for 2 minutes. The finish is baked for 30 minutes at 190° C. A 22 μm thick acetone-resistant film is obtained, which has a pendulum hardness of 146 sec and an Erichsen cupping value of 7 mm, and exhibits 20 mm rust penetration after 70 hours in the salt spray test.

EXAMPLE 4

A polymer is prepared, by the method described in Example 1, from 33 parts of the solution of the blocked isocyanate (B3), 29 parts of hydroxyethyl acrylate, 9 parts of N,N-dimethylaminoethyl acrylate and 29 parts of 2-ethylhexyl acrylate. The polymer solution has a solids content of 60% and a K-value of 25.

Electrocoating finish:

The polymer is 50% neutralized with acetic acid. Phosphatized sheets wired as the cathode are coated in a 10% strength aqueous dispersion of the product at 50 V for 2 minutes. The finish is baked for 30 minutes at 170° C. An 18 μm thick acetone-resistant film is obtained, which has a pendulum hardness of 160 sec and an Erichsen cupping value of 0.5 mm, and exhibits 20 mm rust penetration after 90 hours in the salt spray test.

EXAMPLE 5

A polymer is prepared, by the method described in Example 1, from 25 parts of the solution of the blocked isocyanate (B2), 25 parts of hydroxyethyl acrylate, 20 parts of N,N-dimethylaminopropyl methacrylamide, 10 parts of styrene and 20 parts of 2-ethylhexyl acrylate. 2,2'-Azo-bis-(2,4-dimethylvaleronitrile) is used as the initiator. The polymer solution has a solids content of 59% and a K-value of 20.6.

Electrocoating finish:

After addition of 2% of dibutyl-tin dilaurate, the polymer is 20% neutralized with acetic acid. Phosphatized sheets wired as the cathode are coated in a 10% strength aqueous dispersion of the product at 100 V for 2 minutes. The finish is baked for 30 minutes at 220° C. A 19 μm thick acetone-resistant film is obtained, which has a pendulum hardness of 160 sec and an Erichsen cupping value of 6.5 mm, and exhibits 20 mm rust penetration after 96 hours in the salt spray test.

COMPARATIVE EXAMPLE

A polymer is prepared as described in Example 1 of U.S. Pat. No. 3,883,483. After addition of 2% of dibutyl-tin dilaurate, the polymer is 100% neutralized with gluconic acid. Phosphatized sheets are coated in the 10% strength aqueous dispersion at 200 V for 90 seconds. The finish is baked for 30 minutes at 200° C. A 14 μm thick coating is obtained, which is not acetone-resistant and has a pendulum hardness of 100 sec and an Erichsen cupping value of 10 mm. The rust penetration is more than 20 mm after only 48 hours in the salt spray test.

We claim:

1. A surface-coating binder which is based on a copolymer which contains tertiary amino groups and blocked isocyanate groups and is water-soluble or water-dispersible as a result of being at least partially salified with an acid, wherein the copolymer contains, as copolymerized units, (A) from 6 to 22% by weight of one or more monomeric tertiary amino methacrylic or acrylic acid esters or acrylamides or methacrylamides containing a tertiary amino group, (B) from 21 to 40% by weight of a monomeric adduct of an N-(1-alkenyl)-isocyanate, where 1-alkenyl is of 2 to 4 carbon atoms, and a CH-, OH- or NH-acidic blocking agent, (C) from 0 to 35% by weight of one or more copolymerizable olefinically unsaturated compounds possessing hydrogen atoms which are reactive toward isocyanate groups and (D) from 3 to 73% by weight of one or more copolymerizable olefinically unsaturated compounds not mentioned under (A) to (C), selected from the group consisting of esters of acrylic acid and methacrylic acid with monoalcohols of 1 to 18 carbon atoms, vinyl esters of carboxylic acids of 2 to 10 carbon atoms, vinylaromatics, acrylonitrile and unsaturated triglycerides, the copolymer having a mean molecular weight of from 1,000 to 20,000 and the percentages of (A) to (D) totaling 100.

2. A surface-coating binder at set forth in claim 1, wherein component (B) is an adduct of vinyl isocyanate or propenyl isocyanate and cyclohexanol, tert.-butanol or $\epsilon$-caprolactam in the molar ratio isocyanate/blocking agent of 1:1.

3. A surface-coating binder as set forth in claim 1 or 2, wherein the ratio of equivalents of reactive hydrogen atoms of component (C) to equivalents of blocked isocyanate groups of component (B) is about 1:1.

4. A process for the cathodic electrocoating of metallic articles, wherein the binder used is a surfacecoating binder as set forth in claim 1.

5. A process for the cathodic electrocoating of metallic articles, wherein the binder used is a surfacecoating binder as set forth in claim 1 in combination with a polyfunctional crosslinking agent.

* * * * *